United States Patent
Lee et al.

(10) Patent No.: US 11,062,157 B2
(45) Date of Patent: Jul. 13, 2021

(54) APPARATUS AND METHOD FOR DETECTING FALLING OBJECT

(71) Applicant: LG ELECTRONICS INC., Seoul (KR)

(72) Inventors: Chul Hee Lee, Bucheon (KR); Hyun Kyu Kim, Seoul (KR); Ki Bong Song, Seoul (KR); Sang Kyeong Jeong, Seoul (KR); Jun Young Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 16/575,320

(22) Filed: Sep. 18, 2019

(65) Prior Publication Data
US 2020/0012871 A1    Jan. 9, 2020

(30) Foreign Application Priority Data
Aug. 20, 2019   (KR) .................. 10-2019-0101906

(51) Int. Cl.
| | | |
|---|---|---|
| *G06K 9/00* | (2006.01) | |
| *B60N 2/02* | (2006.01) | |
| *G06T 7/70* | (2017.01) | |

(52) U.S. Cl.
CPC ....... *G06K 9/00832* (2013.01); *B60N 2/0224* (2013.01); *G06T 7/70* (2017.01);
(Continued)

(58) Field of Classification Search
CPC ............. G06T 7/70; G06T 2207/20084; G06T 2207/30268; B60N 2/0224; B60N 2002/0268
(Continued)

(56) References Cited

U.S. PATENT DOCUMENTS

| | | | | |
|---|---|---|---|---|
| 2016/0318424 A1* | 11/2016 | Dlugokecki | ............. | B60N 2/12 |
| 2017/0297587 A1* | 10/2017 | Mimura | ............ | B60W 50/0097 |

FOREIGN PATENT DOCUMENTS

| | | |
|---|---|---|
| JP | 2002166379 | 6/2002 |
| JP | 2009297892 | 12/2009 |

(Continued)

OTHER PUBLICATIONS

Korean Intellectual Property Office Application No. 10-2019-0101906, Notice of Allowance dated Mar. 22, 2021, 2 pages.

*Primary Examiner* — Wendel Cadeau
(74) *Attorney, Agent, or Firm* — Lee, Hong, Degerman, Kang & Waimey PC

(57) ABSTRACT

Disclosed are an apparatus and a method for detecting a fallen object which adjust a passenger's seat to easily pick up the fallen object in the vehicle. A fallen object detecting apparatus according to one embodiment of the present disclosure is an apparatus for detecting a fallen object in a vehicle which includes a camera configured to generate at least one image of an inside of the vehicle; an image identifier configured to identify at least one passenger and at least one object from the image, and to determine a location of the fallen object in response to a falling of the object in the vehicle; and a controller configured to provide the determined location of the fallen object via at least one component located in the vehicle and adjust a seat of the passenger based on the location of the fallen object and a condition of the passenger.

20 Claims, 6 Drawing Sheets

(52) U.S. Cl.
CPC ............... *B60N 2002/0268* (2013.01); *G06T 2207/20084* (2013.01); *G06T 2207/30268* (2013.01)

(58) Field of Classification Search
USPC ......................................................... 382/104
See application file for complete search history.

(56) References Cited

FOREIGN PATENT DOCUMENTS

| | | |
|---|---|---|
| JP | 06450852 | 1/2019 |
| KR | 2020120005732 | 8/2012 |
| KR | 1020180092409 | 8/2018 |

\* cited by examiner (a)  (b)

501  502  503

<STOP>   OBJECT FALLS (603)  602  SUGGEST TO PICK UP (604)

APPARATUS AND METHOD FOR DETECTING FALLING OBJECT

CROSS-REFERENCE TO RELATED APPLICATION

Pursuant to 35 U.S.C. § 119(a), this application claims the benefit of earlier filing date and right of priority to Korean Patent Application No. 10-2019-0101906, filed on Aug. 20, 2019, the contents of which are hereby incorporated by reference herein in its entirety.

BACKGROUND

1. Technical Field

The present disclosure relates to an apparatus and a method for detecting a fallen object which adjust a passenger's seat to easily pick up the object when the object falls in the vehicle.

2. Description of the Related Art

In accordance with the development of communication technologies, cellular phones may provide various services (for example, voice call or video call) anytime, anywhere without being limited to time and places. Therefore, a driver may use a cellular phone even during the driving.

However, when the driver cannot immediately recognize a location of the dropped cellular phone after dropping the used cellular phone while driving, the driver moves to search for the cellular phone and thus cannot concentrate on the driving, which may cause a dangerous situation.

Therefore, for the purpose of convenience and safety of the driving, a lot of cradles which fix the cellular phones in the vehicle so as not to drop the cellular phones in the vehicle have been launched.

Further, a related art suggests a cellular phone cradle for a vehicle in which a support which vertically operates is installed at an upper edge of the cradle to support an upper portion of the cellular phone and a stand which horizontally changes the position is installed at both sides of a lower edge of the cradle to hold the cellular phone regardless the size of the cellular phone.

However, when the driving speed is high or the vehicle travels on a non-paved road, the cellular phone may be easily separated from the cradle to fall in accordance with the increase of the movement of the vehicle.

Therefore, a technique which provides the location of the cellular phone when the cellular phone falls in the vehicle to allow the user to easily pick up the cellular phone and concentrate on the driving is necessary.

RELATED ART DOCUMENT

Patent Document

Patent Document: Korean Unexamined Utility Model Publication No. 20-2012-0005735

SUMMARY OF THE INVENTION

An object of one embodiment of the present disclosure is to provide an apparatus and a method for detecting a fallen object which when it is determined that an object falls in the vehicle, provide a location of the fallen object through an in-vehicle component (for example, a speaker or an AVN screen) or an internal display and adjust a seat of the passenger in the vehicle based on the location of the fallen object and a physical condition (for example, arm length, leg length, or hand length of the passenger) of the passenger to easily pick up the fallen object.

An object of one embodiment of the present disclosure is to prevent the falling of the object in advance by suggesting to move the object to a safe area where it is determined that the object will not fall when the object is predicted to fall in the vehicle, thereby preventing damage to the object.

An object of one embodiment of the present disclosure is to provide guidance of a time to pick up the fallen object by notifying to pick up the object which falls in the vehicle in a stable driving environment or notifying to pick up the object which falls in the vehicle, in advance, when an unstable driving environment is expected.

Further, an object of one embodiment of the present disclosure is to provide notification information about the fallen object through an in-vehicle component when the passenger did not pick up the fallen object even after completing the driving of the vehicle to prevent the fallen object from being left in the vehicle.

According to an aspect of the present disclosure an apparatus for detecting a fallen object in a vehicle includes a camera configured to generate at least one image of an inside of the vehicle; an image identifier configured to identify at least one passenger and at least one object from the image, and to determine a location of the fallen object in response to a falling of the object in the vehicle; and a controller configured to provide the determined location of the fallen object via at least one component located in the vehicle and adjust a seat of the passenger based on the location of the fallen object and a condition of the passenger.

In one embodiment of the present disclosure, the controller is configured to set a range in which the passenger is capable of picking up the object based on the physical condition of the passenger including at least one of arm length, leg length, or hand length, and in response to the location of the object being out of the set range, adjust at least one of position, height, or angle of the seat of the passenger.

In one embodiment of the present disclosure, the image identifier is configured to track a movement of the object from the image generated periodically by the camera and determine, as a tracking result, that the object has fallen based on the object dropping by a predetermined distance or more or dropping to a floor of the vehicle.

In one embodiment of the present disclosure, the controller is configured to restrict an adjusting range of the seat of the passenger within a range in which the object does not become damaged, based on the location of the fallen object.

In one embodiment of the present disclosure, the image identifier is configured to track the movement of the object from the image generated periodically by the camera, and in response to the tracked object being predicted to fall based on at least one of movement or shape of the tracked object, the controller is configured to suggest moving the object to a safe area, where it is determined that the tracked object will not fall, before the tracked object falls.

In one embodiment of the present disclosure, the controller is configured to suggest picking up the fallen object based on the vehicle stopping or being in a sector where the vehicle drives at a predetermined speed or lower, or configured to suggest immediately picking up the fallen object based on the vehicle being expected to turn sharply or drive on an irregular road within a predetermined time or based on the vehicle being expected to rapidly decelerate or accelerate, based on navigation information of the vehicle.

In one embodiment of the present disclosure, based on the fallen object being a communication device capable of being connected to the component in the vehicle via short range wireless communication, the controller is configured to determine whether the object is connected to the component in the vehicle. As a determination result, in response to the object being connected to the component, the controller is configured to temporarily stop providing services of the fallen object and the component. In response to the object being picked up by the passenger, the controller is configured to control the object and the component to continuously provide the service.

In one embodiment of the present disclosure, the image identifier is configured to identify whether the passenger picks up the fallen object from the image periodically generated by the camera. The controller is configured to restrict an adjusting of the seat and suggest picking up the fallen object in response to a command for adjusting the seat to a range in which the fallen object becomes damaged being input in a state where it is identified that the fallen object is not picked up by the passenger.

In one embodiment of the present disclosure, in response to the location of the fallen object being out of the range in which the passenger is capable of picking up the object, the controller is configured to move the fallen object to a pick up range by using a tool installed in the vehicle or change a driving direction or speed of the vehicle to move the fallen object to the pick up range.

In one embodiment of the present disclosure, the image identifier is configured to determine, from the image of the fallen object, whether it is necessary to pick up the fallen object by applying a deep neural network model trained for determining whether the object is necessary for the passenger. The controller is configured to restrict the providing of the location of the object and the adjusting of the seat of the passenger base on a determination that it is not necessary to pick up the fallen object.

In one embodiment of the present disclosure, based on the determination that it is not necessary to pick up the fallen object, the controller removes the object which is not necessary to pick up using a tool in the vehicle.

One embodiment of the present disclosure further includes a display configured to display a location of the fallen object.

According to another aspect of the present disclosure, a method for detecting a fallen object in a vehicle includes generating at least one image of an inside of the vehicle; identifying at least one passenger and at least one object from the image, and determining a location of the fallen object in response to a falling of the object in the vehicle; and providing the location of the fallen object via at least one component in the vehicle and adjusting a seat of the passenger based on the location of the fallen object and a condition of the passenger.

In one embodiment of the present disclosure, the adjusting of a seat of the passenger includes: setting a range where the passenger can pick up the object based on the physical condition of the passenger including at least one of arm length, leg length, or hand length of the passenger and in response to the location of the object being out of the set range, adjusting at least one of position, height, or angle of the seat of the passenger.

In one embodiment of the present disclosure, the method may further include tracking the movement of the object from the periodically generated image and determining, as the tracking result, that the object has fallen based on the object dropping by a predetermined distance or more or dropping to a floor of the vehicle.

In one embodiment of the present disclosure, the method may further include tracking the movement of the object from the image generated periodically by the camera, and in response to the tracked object being predicted to fall based on at least one of movement or a shape of the tracked object, suggesting to move the object to a safe area, where it is determined that the tracked object will not fall, before the tracked object falls.

In one embodiment of the present disclosure, the method may further include: suggesting to pick up the fallen object based on the vehicle stopping or being in a sector where the vehicle drives at a predetermined speed or lower; and suggesting to immediately pick up the fallen object based on the vehicle being expected to make a sharp turn or drive on an irregular road within a predetermined time or based on the vehicle being expected to rapidly decelerate or accelerate, based on the navigation information of the vehicle.

In one embodiment of the present disclosure, the method may include: based on the fallen object being a communication device capable of being connected to the component in the vehicle via short range wireless communication; determining whether the object is connected to the component in the vehicle and in response to the object being connected to the component, as a determination result, temporarily stopping providing services in the fallen object and the component; and in response to the object being picked up by the passenger, controlling the object and the component to continuously provide the service.

In one embodiment of the present disclosure, the method may include: identifying whether the passenger picks up the fallen object from the image periodically generated; and restricting the adjusting of the seat and suggesting to pick up the fallen object in response to a command for adjusting the seat to a range where the fallen object becomes damaged is input in a state where it is identified that the fallen object is not picked up by the passenger.

In one embodiment of the present disclosure, the method may include determining, from the image of the fallen object, whether it is necessary to pick up the fallen object by applying a deep neural network model trained for determining whether the object is necessary for the passenger, and restricting the providing of the location of the object and the adjusting of the seat of the passenger based on a determination that it is not necessary to pick up the fallen object.

In addition, other methods and other systems for implementing the present disclosure, and a computer-readable medium for storing a computer program for executing the above method may be further provided.

Other aspects, features, and advantages other than those described above will become apparent from the following drawings, claims, and the detailed description of the present disclosure.

According to the present disclosure, when it is determined that an object falls in the vehicle, a location of the fallen object is provided through a component in a vehicle or an internal display, and a seat of the passenger in the vehicle is adjusted based on the location of the fallen object and a physical condition (for example, arm length, leg length, or hand length of the passenger) of the passenger to easily pick up the fallen object.

According to the present disclosure, when the object is predicted to fall in the vehicle, movement of the object to a safe area which is determined that the object will not fall is suggested before the object falls to prevent the falling of the object in advance, thereby preventing damage to the object.

According to the present disclosure, a time to pick up the fallen object may be provided as guidance by a notification to pick up the fallen object in the vehicle in a stable driving environment or a notification to pick up the fallen object in advance when an unstable driving environment is expected.

Further, according to the present disclosure, when the passenger does not pick up the fallen object even after completing the driving of the vehicle, notification information about the fallen object is provided through a component in a vehicle to prevent the fallen object from being left in the vehicle.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
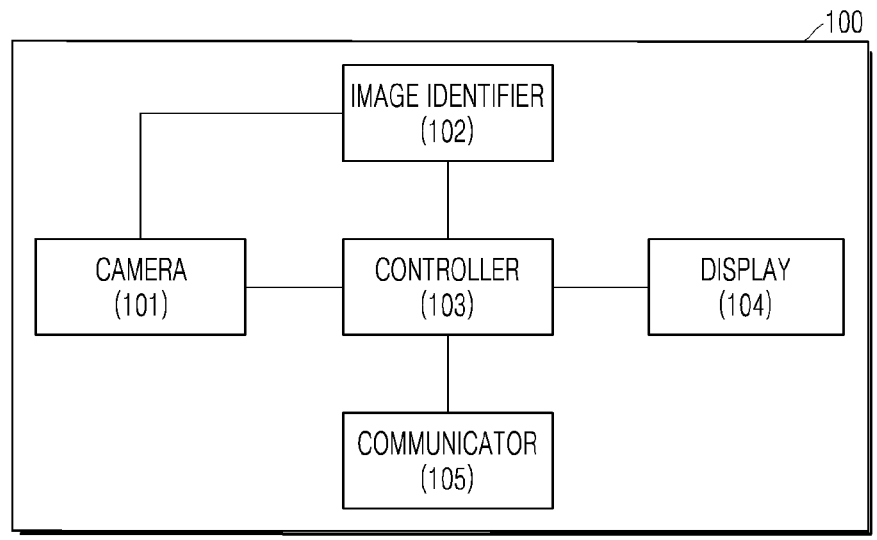
FIG. 1 is a diagram illustrating a configuration of a fallen object detecting apparatus according to an embodiment of the present disclosure.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

The vehicle described in the present specification may include, but is not limited to, a vehicle having an internal combustion engine as a power source, a hybrid vehicle having an engine and an electric motor as a power source, and an electric vehicle having an electric motor as a power source.

Further, the vehicle described in the present specification may be an autonomous vehicle.

Autonomous driving refers to a technology in which driving is performed autonomously, and an autonomous vehicle refers to a vehicle capable of driving without manipulation of a user or with minimal manipulation of a user. For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

Specifically, the autonomous vehicle may include an autonomous driving control module to control an autonomous driving function and the autonomous driving control module may refer to a software module or a chip obtained by implementing the software module as hardware. The autonomous driving control module may be included inside as a component of the autonomous vehicle, but may be configured as a separate hardware at the outside of the autonomous to be connected thereto.

The autonomous vehicle may obtain status information of the autonomous vehicle, detect (recognize) surrounding environment and objects, generate map data, determine a travel path and navigation plan, or determine an operation, using sensor information obtained from various types of sensors.

Here, the autonomous vehicle may use sensor information obtained from at least one of sensors including lidar, radar, and camera to determine a travel path and navigation plan.

Specifically, the autonomous vehicle may recognize environments or objects in an area where a field of view is blocked or an area separated by a predetermined distance by receiving sensor information from external devices or receive directly recognized information from the external devices.

The autonomous vehicle may perform the operations above by using a learning model built on at least one or more artificial neural networks. For example, the autonomous vehicle may recognize the surroundings and objects by using the learning model and determine a travel line using the recognized surrounding information or object information. Here, the learning model may be directly trained in the autonomous vehicle or trained by an external device such as the AI server.

At this time, the autonomous vehicle may perform the operation by generating a result by employing the learning model directly but also perform the operation by transmitting sensor information to an external device such as the AI server and receiving a result generated accordingly.

The autonomous vehicle may determine a travel path and navigation plan using at least one or more of map data, object information detected from the sensor information, or object information obtained from the external device and controls a driving unit to navigate the autonomous vehicle according to the determined travel path and navigation plan.

The map data may include object identification information about various objects disposed in a space in which the autonomous vehicle navigates. For example, the map data may include object identification information about static objects such as streetlights, rocks and buildings and movable objects such as vehicles and pedestrians. In addition, the object identification information may include the name, type, distance, location, and so on.

Also, the autonomous vehicle may control the driving unit based on the control/interaction of the user to perform the operation or navigate the space. At this time, the autonomous vehicle may obtain intention information of the interaction due to the user's motion or voice command and perform an operation by determining a response based on the obtained intention information.

FIG. 1 is a diagram illustrating a configuration of a fallen object detecting apparatus according to an embodiment of the present disclosure.

Referring to FIG. 1, a fallen object detecting apparatus 100 according to one embodiment of the present disclosure is a device which detects the falling of an object in the vehicle and is installed in the vehicle. The fallen object detecting apparatus 100 may include an camera 101, an image identifier 102, a controller 103, a display 104, and a communicator 105.

The camera 101 may be, for example, one or more cameras, and may generate at least one image inside the vehicle. Such camera 101 may capture the inside of the vehicle where a passenger (for example, a driver or occupant) and an object are present at a predetermined time interval (for example, every one second) to generate an image (for example, a two-dimensional or three-dimensional image). The camera 101 may be an existing camera installed in the vehicle but is not limited thereto and may be a separate camera for monitoring the detection of fallen objects.

The image identifier 102 may use a deep neural network trained to recognize humans and objects to extract the passenger and object from the image generated by the camera 101, and may identify at least one passenger and at least one object from the image. When the object is extracted, the image identifier 102 may also extract the object type (for example, litter, a wallet, a smartphone, or wireless earphones). When a device capable of performing short range wireless communication (for example, Bluetooth or Wi-Fi) with a component in the vehicle is extracted as the object, the image identifier 102 may identify the object as a communication device. Here, the device capable of performing short range wireless communication may be any one of a smartphone, wireless earphones, a tablet PC, and a notebook computer.

When the passenger and the object are identified from the image generated periodically by the camera 101, the image identifier 102 may track a motion (for example, a change of a coordinate of an upper body, a direction of a face, or arms) of the passenger and a movement of the object from the image. The image identifier 102 may detect the moving distance and direction of arms, legs, a head, and a face of the passenger from the image by using a skeletonization algorithm to track the motion of the passenger. Further, the image identifier 102 may track the movement of the object and identify the location of the object by detecting the moving distance and direction of the object from the image using an object detection algorithm.

As a tracking result, based on the object dropping by a predetermined distance or more or dropping to a floor of the vehicle, the image identifier 102 may determine that the object has fallen. That is, based on the object dropping by a predetermined distance or more or dropping to a floor of the vehicle as the object is separated or moved from a cradle, a seat, or hands of the passenger, the image identifier 102 may determine that the object has fallen.

When the passenger carries the object, the image identifier 102 may determine that the object has fallen based on a distance between the hands of the passenger and the object being a predetermined interval or more and based on the object dropping a predetermined distance or more, as the tracking result. That is, the image identifier 102 may determine whether the object has fallen by further identifying whether the object has separated from the hands of the passenger in addition to the falling distance of the object. Accordingly, even though the object drops a predetermined distance or more in the vehicle, when the distance between the hands of the passenger and the object is not a predetermined interval or more, the image identifier 102 may determine that the object has not fallen. As a result, even though the object drops a predetermined distance or more, based on the object being in contact with the hands of the passenger, the image identifier 102 may determine that the object has not fallen by recognizing that the passenger has moved his or her hand in a downward direction in a state of holding the object in his or her hand.

When it is determined that the object has fallen in the vehicle based on an image periodically generated by the camera 101, the image identifier 102 may identify a location of the fallen object based on the image.

The image identifier 102 may identify whether the passenger picks up the fallen object from the image periodically generated by the camera 101. Specifically, as a result of tracking the passenger and the object in the image periodically generated by the camera 101, based on a distance between the hand of the passenger and the fallen object being less than the predetermined interval (for example, 0.1 mm), or the hand of the passenger being in contact with the object, and the fallen object rising a predetermined distance or more, the image identifier 102 may determine that the passenger has picked up the fallen object.

Such image identifier 102 may identify at least one passenger and at least one object from the image, and in response to the falling of the object in the vehicle, may determine the position of the fallen object. The determined position of the fallen object may be provided to the controller 103.

The controller 103 may provide falling information about the object and the location of the fallen object determined by the image identifier 102 via at least one component in the vehicle (for example, a speaker or an audio video navigation (AVN) screen) or the display 104. For example, in response to a cellular phone falling in the vehicle, the controller 103 may provide a message about the fallen object informing that the cellular phone has fallen to the right side of the gearbox console via a speaker in the vehicle or provide an image displaying the location of the cellular phone to the right side of the gearbox console via the display 104.

Thereafter, the controller 103 may adjust the seat of the passenger in the vehicle based on the location of the object and the condition (for example, physical condition) of the passenger. The controller 103 may adjust the seat of the passenger to a distance such that the hand or foot of the passenger is able to reach the location of the fallen object. In addition, the controller 103 may set a range (for example, a location accessible by the hand or foot of the passenger) where the passenger is able to pick up the object based on the physical condition of the passenger including at least one of arm length, leg length, or hand length of the passenger, and in response to the location of the object being out of the set range (that is, the hand or foot of the passenger not being able to reach the fallen object), may adjust at least one of position, height, or angle of the seat of the passenger to allow the passenger to take a position to easily pick up the fallen object.

Before adjusting the seat of the passenger, when it is identified that the passenger searches for the object via the image identifier 102, the controller 103 may move the seat when the passenger intends to pick up the object by adjusting the seat of the passenger in the vehicle. In this case, the image identifier 102 may determine whether the passenger lowers his or her head based on a motion tracking result of the passenger and based on a determination that the passenger has lowered his or her head, may confirm that the passenger searches for the object. Here, the image identifier 102 may determine whether the passenger has lowered his or her head based on how much the face (or the head) of the passenger as moved and a direction of movement. As another example, the image identifier 102 may identify whether the passenger searches for the object from the image by using a deep neural network model trained to determine whether the passenger searches for the object to pick up the fallen object.

When the seat of the passenger is adjusted, the controller 103 may restrict an adjusting range of the seat of the passenger to within a range where the object does not become damaged, based on the location of the fallen object to prevent damage to the object caused by the movement of the adjusted seat. That is, the controller 103 may prevent the seat from moving to a location where the object may be damaged and allow the passenger to pick up an object that is intact.

Further, in response to the location of the fallen object being out of the range where the passenger may pick up the object, the controller 103 may move the fallen object to a range where the fallen object is able to be picked up by using a tool (for example, a wireless cleaner) installed in the vehicle. As another example, in response to the location of the fallen object being out of the range where the passenger is able to pick up the object, the controller 103 may change a driving direction or a speed of the vehicle to move the fallen object to a pick up range or provide guidance for changing the driving direction or the speed via a component in the vehicle (for example, internal display).

For example, when the fallen object is located on the left side of the pick up range, the controller 103 may move the fallen object to the right by using the tool or by making a left turn (or a left lane change) to move the fallen object to the pick up range.

The controller 103 may control the tool or the driving direction (speed) the vehicle before adjusting the seat, but the present disclosure is not limited thereto. When the fallen object remains out of the range that the passenger is able to pick up the object even after primarily adjusting the seat, the controller 103 may secondarily control the tool or the driving direction (speed) of the vehicle to allow the passenger to easily pick up the fallen object. Here, the range that the passenger is able to pick up the object may vary before and after adjusting the seat of the passenger.

The controller 103 may predict whether the tracked object falls based on at least one of movement or a shape of the tracked object from the image periodically generated. In this case, in response to the tracked object being predicted to fall, the controller 103 may suggest to move the tracked object to a safe area where it is determined that the tracked object will not fall, before the tracked object falls. For example, when the object moves (sways in both directions) more than a set value or a shape of the object is circular (or cylindrical), the controller 103 may predict that the object will fall. In this case, before the object falls, the controller 103 may determine a storage container in the vehicle and a cup holder to be a safe area where it is determined that the object will not fall, and may suggest moving the object to the determined safe area. In this case, the controller 103 may suggest moving the object to the safe area via the component in the vehicle (for example, a speaker or an AVN screen) or the display 104.

Furthermore, after the object falls in the vehicle, when the object is moved to a same area where the object was located prior to falling, the controller 103 may predict that the object will fall again and suggest moving the object to the safe area.

The controller 103 may provide guidance of a time to pick up the fallen object by notifying the passenger to pick up the fallen object in the vehicle in a stable driving environment or notifying the passenger to pick up the fallen object in advance when an unstable driving environment is expected. Specifically, when the vehicle stops or is in a sector in which the vehicle drives at a predetermined speed or lower, the controller 103 may suggest picking up the fallen object. Furthermore, when the vehicle is expected to make a sharp turn or drive on an irregular road within a predetermined time, or when the vehicle is expected to rapidly decelerate or accelerate, based on the navigation information of the vehicle, the controller 103 may suggest immediately picking up the fallen object. Here, the controller 103 may obtain navigation information of the vehicle (for example, a road on which the vehicle drives, a road shape, a road surface, and a speed of the vehicle on the road) corresponding to the destination from the current location of the vehicle from the map server via the communicator 105.

In a state where the image identifier 102 identifies that the fallen object has not been picked up by the passenger, in response to a command for adjusting the seat to a range where the fallen object is capable of being damaged is input, the controller 103 may restrict the adjusting of the seat and suggests picking up the fallen object. That is, when the command for adjusting the seat is input, the controller 103 may determine that the movement range of the seat adjusted in response to the adjusting command includes the location of the fallen object. When it is determined that the location of the fallen object is included in the movement range of the seat, the controller 103 may restrict the adjusting of the seat and recommend picking up the fallen object due to the determination that the adjusting of the seat may damage the fallen object.

Further, the controller 103 may determine whether it is necessary to pick up the fallen object via the image identifier 102. Here, the image identifier 102 may determine whether it is necessary to pick up the fallen object depending on whether the type of the fallen object is included in a set list or determine whether it is necessary to pick up the fallen object by applying a deep neural network model trained to determine, from the image of the fallen object, whether the fallen object is necessary for the passenger.

As a determination result, based on a determination that it is not necessary to pick up the fallen object (for example, litter), the controller 103 may restrict (omit) the providing of the location of the object and adjust the seat of the passenger. Further, as the determination result, based on the determination that it is not necessary to pick up the fallen object, the controller 103 may remove the object by using a tool in the vehicle (for example, a wireless cleaner).

Based on the fallen object being a communication device capable of being connected with the component in the vehicle via short range wireless communication, the controller 103 may identify whether the fallen object is connected to the component in the vehicle via short range wireless communication. Specifically, the controller 103 may requests identification information of the fallen object via the communicator 105. When the object identification information received from the object coincides with identification information of a device connected with the component in the vehicle as a response for the request, the controller 103 may identify that the object is connected with the component via short range wireless communication. In this case, the controller 103 may receive identification information of a device connected with the component, from the component in the vehicle, via the communicator 105.

As an identifying result, based on the fallen object being connected with the component in the vehicle via short range wireless communication, the controller 103 may temporarily stop providing services (for example, video playback or game play) of the fallen object and the component, and in response to the image identifier 102 determining that the object has been picked up by the passenger, the controller 103 may control the object and the component to continuously provide services. That is, when an object providing a service has fallen, the service is not normally provided to the passenger, therefore the controller 103 may temporarily stop the service provided by the object and the component, and when the passenger picks up the fallen object to continue the providing of the normal service, the controller 103 may resume the providing of the service of the object and the component.

Further, if the passenger does not pick up the fallen object, when the driving of the vehicle is completed, the controller 103 provides notification information about the fallen object (for example, the object falls on the floor) through the component in the vehicle or the display 104 so that even though the passenger does not pick up the object immediately falling the object, the presence of the fallen object is notified. Therefore, the passenger may pick up the object without forgetting.

The display 104 may display information about the object (for example, the location of the fallen object) or provide guidance for the object (for example, guidance for moving the object to the safe area or guidance for picking up the fallen object). The display 104 may be a display for providing the information about the object, but is not limited thereto and may be replaced with an existing component in the vehicle (for example, an AVN screen).

The communicator 105 may receive navigation information of the vehicle from a map server, receive identification information from the fallen object in the vehicle, or receive identification information of a connected device from the component in the vehicle.

Figure 2:
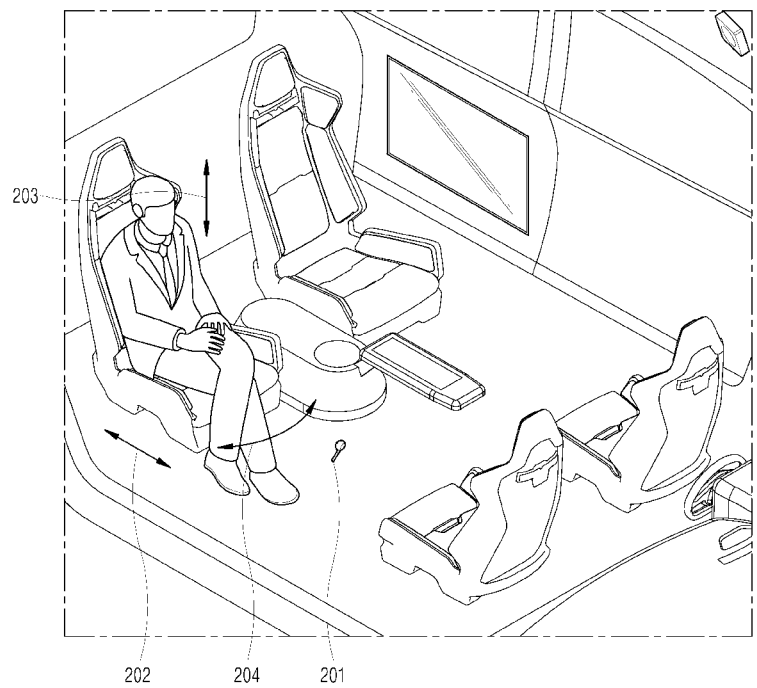
FIGS. 2 and 3 are diagrams illustrating an example of adjusting a seat of a passenger in a fallen object detecting apparatus according to an embodiment of the present disclosure.
Figure 3:
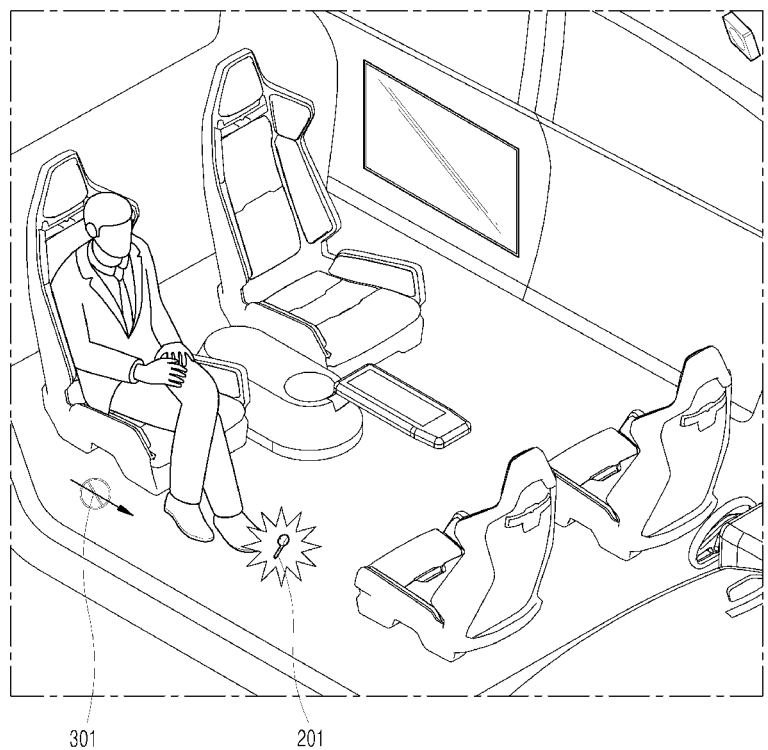

FIGS. 2 and 3 are diagrams illustrating an example of adjusting a seat of a passenger in a fallen object detecting apparatus according to an embodiment of the present disclosure.

Referring to FIG. 2, when it is determined that an object has fallen in the vehicle from an image obtained by periodically capturing the inside of the vehicle, the fallen object detecting apparatus may provide the location of the fallen object via the component (for example, a speaker or an AVN screen) or the display. In this case, the fallen object detecting apparatus may adjust at least one of position (for example, front or rear), height (for example, up or down), or angle (for example, a direction) of the seat of the passenger in the vehicle, based on the location of the fallen object and a physical condition (for example, arm length, leg length, or hand length of the passenger) of the passenger.

For example, when it is determined that "wireless earphones" 201 have fallen in the vehicle, the fallen object detecting apparatus provides the location of the fallen "wireless earphones" 201 via a speaker in the vehicle and adjusts at least one of a front/rear position 202, up/down height 203, or left/right angle 204 of the seat of the passenger so that the hand of the passenger is able to reach the fallen "wireless earphones" 201. Therefore, the passenger may easily pick up the "wireless earphones" 201.

As illustrated in FIG. 3, the fallen object detecting apparatus may restrict the adjusting range of the seat of the passenger to within a range where the "wireless earphones" 201 will not become damaged, based on the location of the falling "wireless earphones" 201, so that the adjusting range of the seat does not intrude the range where the "wireless earphones" 201 will become damaged. Therefore, damage to the "wireless earphones" 201 due to the adjusting of the seat may be prevented.

Figure 4:
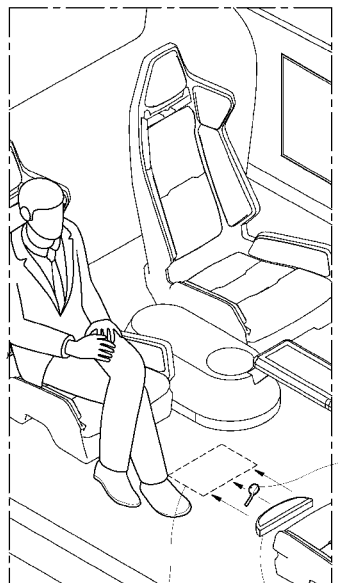
FIG. 4 is a diagram illustrating an example of a tool in a vehicle moving a fallen object in a fallen object detecting apparatus according to an embodiment of the present disclosure.
Figure 4:
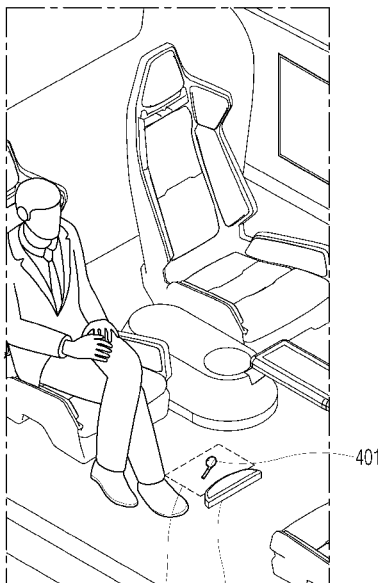

FIG. 4 is a diagram illustrating an example of a tool in a vehicle moving a fallen object in a fallen object detecting apparatus according to an embodiment of the present disclosure.

Referring to FIG. 4, when the location of the fallen object in the vehicle is out of the range where the passenger is able to pick up the object (for example, a location accessible by the hand or foot of the passenger), the fallen object detecting apparatus may move the fallen object to a range where the fallen object is able to be picked up by using a tool installed in the vehicle.

For example, when the location of "wireless earphones" 401 which has fallen in the vehicle is out of a range 402 where the passenger is able to pick up the object, the fallen object detecting apparatus may control a "wireless cleaner" 403 installed in the vehicle to push and move the "wireless earphones" 401 in the range where the passenger is able to pick up the object. Thus, the passenger may easily pick up the "wireless earphones" 401.

Figure 5:
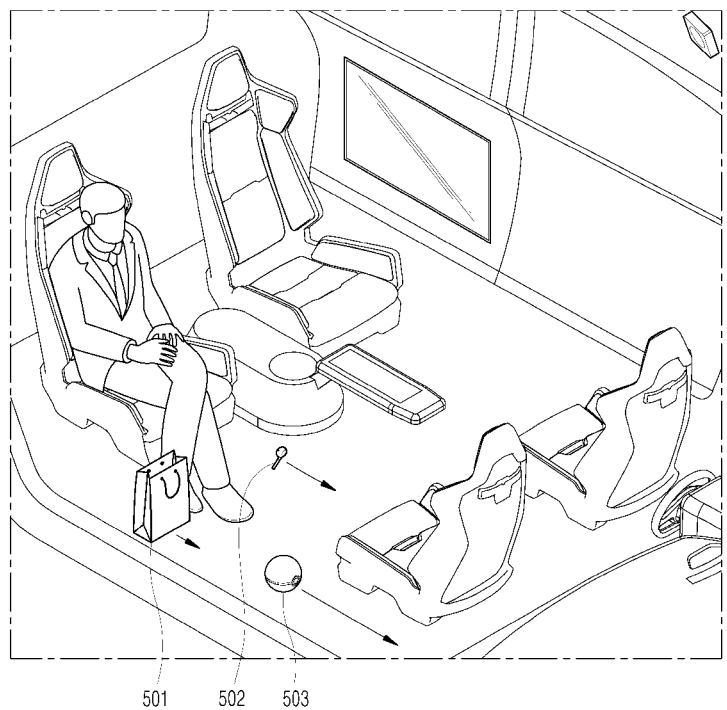
FIG. 5 is a diagram for explaining an example of guidance for picking up a fallen object by predicting a movement of a fallen object in a vehicle in a fallen object detecting apparatus according to an embodiment of the present disclosure.

FIG. 5 is a diagram illustrating an example of guidance for picking up a fallen object by predicting a movement of a fallen object in a vehicle in a fallen object detecting apparatus according to an embodiment of the present disclosure.

Referring to FIG. 5, the fallen object detecting apparatus may identify the movement of the fallen object based on a result of tracking an object in an image which is periodically generated by the camera, in a vehicle being driving. In this case, the object may move differently according to the weight and shape of the object.

For example, when the objects which have fallen in the vehicle being driven are a "briefcase" 501, "wireless earphones" 502, and a "ball" 503, the circular "ball" 503, which is light in weight and able to be rolled, may move the farthest, the "wireless earphones" 502, which is lighter in weight than the "briefcase" 501, may move farther than the "briefcase" 501 but not as far as the "wireless earphones" 502, and the "briefcase" 501, which is heavier than the other objects, may move the least.

Therefore, the fallen object detecting apparatus may provide guidance for picking up the objects based on weight and shape in descending order of the moving distance of the objects, that is, the "ball" 503, the "wireless earphone" 502, and the "briefcase" 501, via the component in the vehicle, or provide guidance for immediately picking up the "ball" 503, which may move the farthest, via the component in the vehicle.

Figure 6:
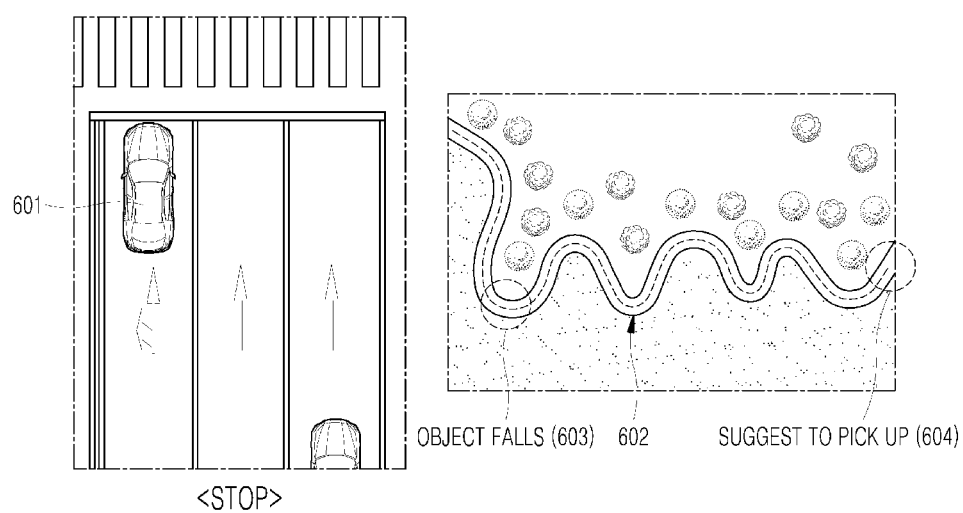
FIG. 6 is diagram for explaining an example of guidance of a pick up time of a fallen object in a fallen object detecting apparatus according to an embodiment of the present disclosure.

FIG. 6 is diagram for explaining an example of guidance of a pick up time of a fallen object in a fallen object detecting apparatus according to an embodiment of the present disclosure.

Referring to FIG. 6, the fallen object detecting apparatus may provide guidance of a pick up time for the object which has fallen in a vehicle. For example, when the vehicle is expected to make a sharp turn or drive on an irregular road within 20 seconds or when the vehicle is expected to rapidly decelerate or accelerate, based on the navigation information of the vehicle, the fallen object detecting apparatus may suggest immediately picking up the object which has fallen in the vehicle.

Further, when a vehicle 601 stops or is in a sector where the vehicle drives at a predetermined speed or lower, the fallen object detecting apparatus may suggest picking up the fallen object.

As another example, as the vehicle drives on a winding road 602, when the object falls at a time 603 when the vehicle enters the winding road 602, the fallen object detecting apparatus may suggest picking up the fallen object at a time 604 when the vehicle exits the winding road 602.

Figure 7:
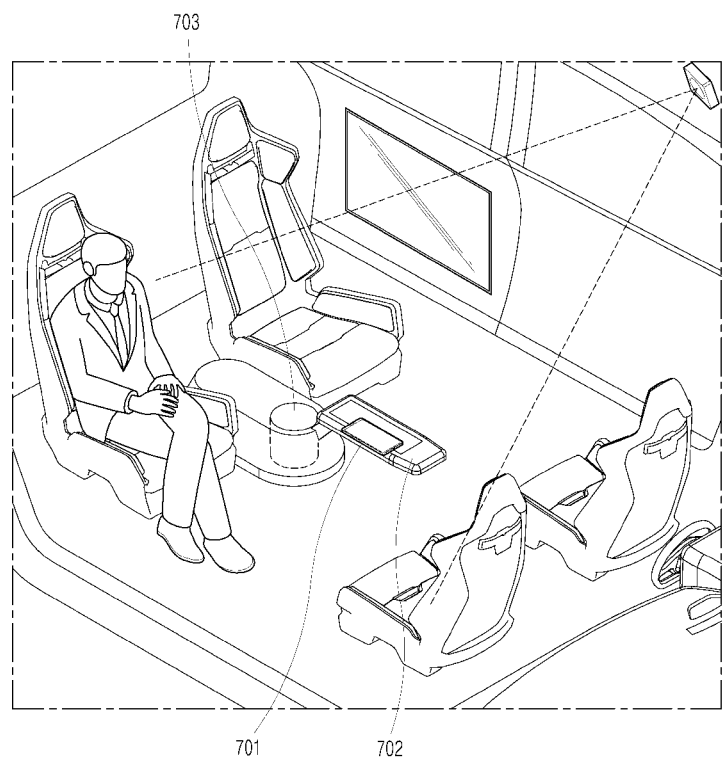
FIG. 7 is diagram for explaining an example of guidance for safely storing an object predicted to fall in a vehicle in a fallen object detecting apparatus according to an embodiment of the present disclosure.

FIG. 7 is diagram for explaining an example of guidance for safely storing an object predicted to fall in a vehicle in a fallen object detecting apparatus according to an embodiment of the present disclosure.

Referring to FIG. 7, when the object is predicted to fall in consideration of at least one of the movement of the object in the vehicle or the shape of the object, the fallen object detecting apparatus may suggest keeping the object in a safe location before the object falls.

For example, the fallen object detecting apparatus may periodically capture the inside of the vehicle to generate an image, and when a "cellular phone" 701 is extracted from the image, may track the "cellular phone" 701 to identify the movement of the "cellular phone" 701. In this case, when the "cellular phone" 701 moves more than a set value (for example, 10 cm) or the "cellular phone" 701 is located on an edge (an area within a predetermined interval from an edge of the surface of a dashboard) of the surface of a dashboard 702, the fallen object detecting apparatus may predict that the "cellular phone" 701 will fall. Therefore, the fallen object detecting apparatus may suggest moving the object to a safe area where it is determined that the "cellular phone" 701 will not fall, for example, a console box 703 between the seats, to prevent the object from falling in advance. Therefore, the object does not become damaged. In this case, the fallen object detecting apparatus may output a message to suggest moving the object such as, "The cellular phone may fall. Please move the cellular phone to a safe area such as the console box," via the speaker in the vehicle.

Figure 8:
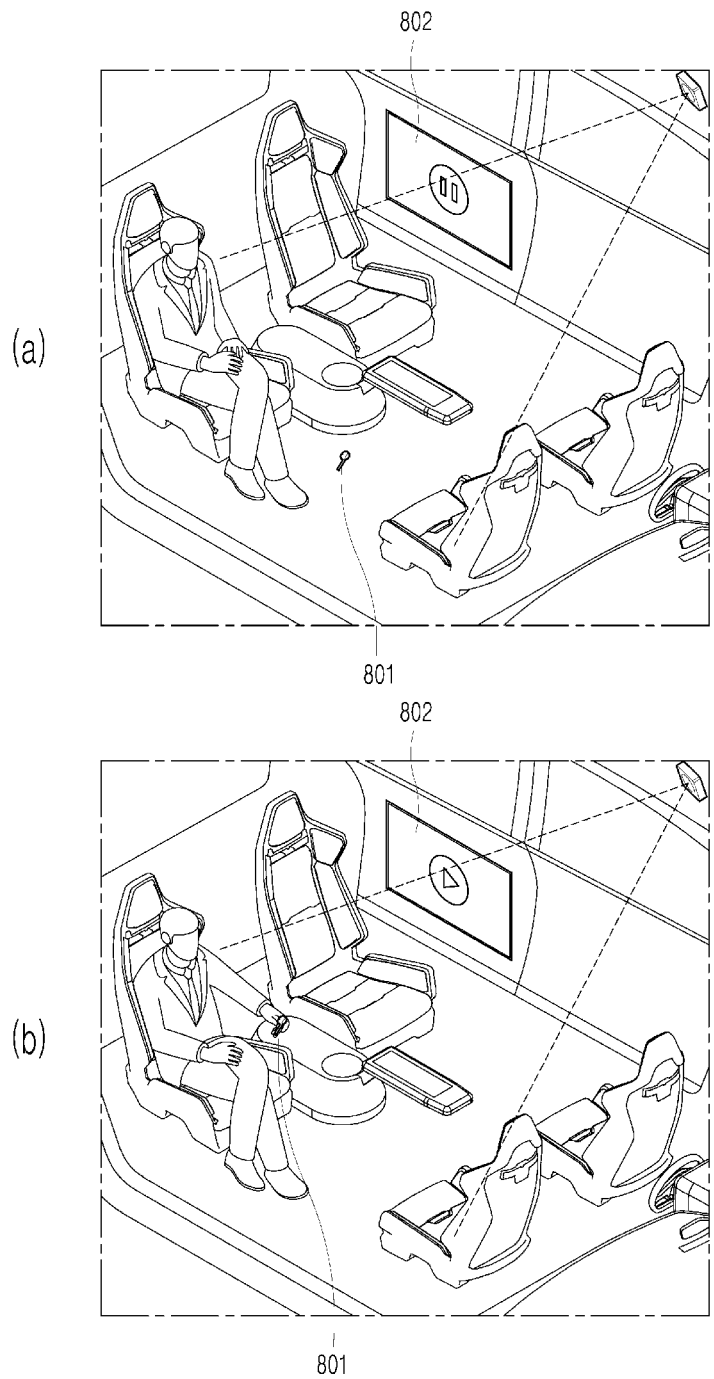
FIG. 8 is diagram for explaining an example of controlling a service provided by a fallen object in a vehicle in a fallen object detecting apparatus according to an embodiment of the present disclosure.

FIG. 8 is diagram for explaining an example of controlling a service provided by a fallen object in a vehicle in a fallen object detecting apparatus according to an embodiment of the present disclosure.

Referring to FIG. 8, the fallen object detecting apparatus may identify whether the fallen object in the vehicle is connected to the component in the vehicle via short range wireless communication. For example, when "wireless earphones" 801 fall in the vehicle, the fallen object detecting apparatus may request identification information to the falling "wireless earphones" 801. When the identification information received from the "wireless earphones" 801 as a response to the request coincides with identification information of the device connected to the component in the vehicle, for example, a display 802 (or AVN screen), the fallen object detecting apparatus may confirm that the "wireless earphones" 801 and the display 801 in the vehicle are connected via short range wireless communication.

When the fallen object is connected to the display 802 in the vehicle via short range wireless communication, as the identifying result, the fallen object detecting apparatus may temporarily stop the service (for example, video playback) provided by the fallen "wireless earphones" 801 and the display 802 in the vehicle. When the "wireless earphones" 801 is picked up by the passenger, the fallen object detecting apparatus may control the "wireless earphones" 801 and the display 802 in the vehicle to continuously provide the service. That is, when the "wireless earphones" 801 which provides a service falls, the service may no longer be normally provided to the passenger, therefore the fallen object detecting apparatus may temporarily stop the service (for example, video playback) provided by the falling "wireless earphones" 801 and the display 802 in the vehicle, and as the passenger picks up the fallen "wireless earphones" 801, the "wireless earphones" 801 and the display 802 in the vehicle may resume the providing of the service.

Figure 9:
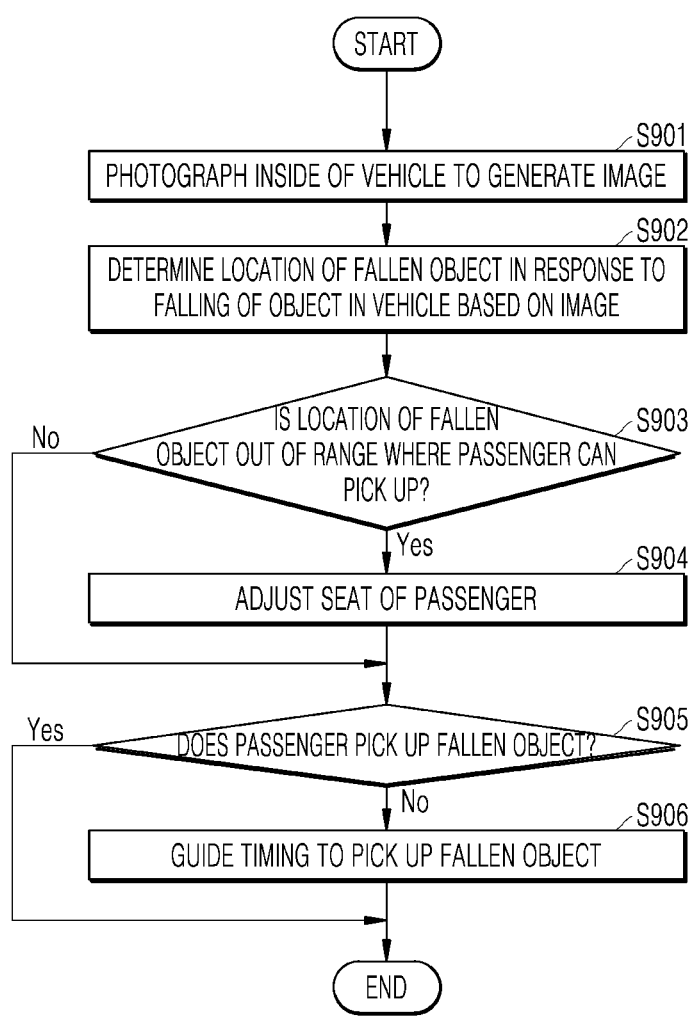
FIG. 9 is a flowchart illustrating a fallen object detecting method according to an embodiment of the present disclosure.

FIG. 9 is a flowchart illustrating a fallen object detecting method according to an embodiment of the present disclosure.

Referring to FIG. 9, in step S901, a fallen object detecting apparatus, for example, may use at least one camera to generate at least one image of the inside of a vehicle. The fallen object detecting apparatus may periodically capture the inside of the vehicle where a passenger (for example, a driver or an occupant) and an object are present to generate an image. Here, the fallen object detecting apparatus may capture the inside of the vehicle where a passenger (for example, a driver or an occupant) and an object are present at a predetermined time interval (for example, every one second) by using an internal camera or an existing camera installed in the vehicle to generate an image (for example, a two-dimensional or three-dimensional image).

The fallen object detecting apparatus may use a deep neural network trained to recognize humans and objects to extract the passenger and object from the image generated by the camera 101, and may identify at least one passenger and at least one object from the image. In this case, when the object is extracted, the fallen object detecting apparatus may also extract an object type (for example, litter, a wallet, a smartphone, or wireless earphones). Here, when any one device of a smartphone, wireless earphones, a tablet PC, and a notebook computer, which are capable of performing short range wireless communication with the component in the vehicle, is extracted as the object, the fallen object detecting apparatus may confirm the object as a communication device.

When the passenger and the object are identified from the image, the fallen object detecting apparatus may track a motion (for example, a change of a coordinate of an upper body, a direction of a face, and arms) of the passenger and the movement of the object from the image generated periodically. In this case, the fallen object detecting apparatus may detect the moving distance and direction of arms, legs, a head, and a face of the passenger from the image by using a skeletonization algorithm to track the motion of the passenger. Further, the fallen object detecting apparatus may track the movement of the object and identify the location of the object by detecting the moving distance and direction of the object from the image using an object detection algorithm.

The fallen object detecting apparatus may predict whether the tracked object will fall based on at least one of movement or a shape of the tracked object. In this case, in response to the tracked object being predicted to fall, the fallen object detecting apparatus may suggest moving the tracked object to a safe area where it is determined that the tracked object will not fall via the component in the vehicle (or internal display) to prevent the object from falling. For example, when the object moves (shakes) more than a set value or a shape of the object is circular (or cylindrical), the fallen object detecting apparatus may predict that the object will fall. In this case, the fallen object detecting apparatus may determine that a storage container in the vehicle and a cup holder as a safe area, and may suggest moving the object to the determined safe area to keep the object intact. In this case, the fallen object detecting apparatus may suggest moving the object to the safe area via the component in the vehicle (for example, a speaker or an AVN screen) or the internal display.

As the tracking result, based on the object dropping by a predetermined distance or more or dropping to the floor of the vehicle, the fallen object detecting apparatus may determine that the object has fallen. That is, based on the object being separated or moved from a cradle, a seat, or the hands of the passenger by a predetermined distance or more or dropped to the floor, the fallen object detecting apparatus may determine that the object has fallen.

When the passenger carries the object, the fallen object detecting apparatus may determine that the object has fallen based on a distance between the hands of the passenger and the object being a predetermined interval or more and based on the object dropping a predetermined distance or more, as the tracking result. That is, the fallen object detecting apparatus may determine whether the object has fallen by further identifying whether the object has separated from the hands of the passenger in addition to the falling distance of the object.

In step S902, in response to a determination that the object has fallen in the vehicle, the fallen object detecting apparatus may determine the location of the fallen object. In this case, the fallen object detecting apparatus may provide the determined position of the fallen object via at least one component in the vehicle. In this case, the fallen object detecting apparatus may set a range where the passenger is able to pick up the object (for example, an accessible location by the hand or foot of the passenger) based on the physical condition of the passenger including at least one of arm length, leg length, or hand length of the passenger, and may identify whether when the location of the fallen object is out of the set range.

In step S903, in response to the location of the fallen object being out of the range where the passenger is able to pick up the fallen object, the fallen object detecting apparatus may adjust the seat of the passenger in the vehicle in step S904. In this case, the fallen object detecting apparatus may adjust the seat of the passenger based on the location of the fallen object and the condition of the passenger. Specifically, the fallen object detecting apparatus may adjust at least one of position, height, or angle of the seat of the passenger in the vehicle to a distance where the hand or foot of the passenger reaches the location of the fallen object. When the seat of the passenger is adjusted, the fallen object detecting apparatus may restrict an adjusting range of the seat of the passenger within a range where the object does not become damaged, based on the location of the fallen object to prevent the damage of the object due to the adjusted seat.

Before adjusting the seat of the passenger, the fallen object detecting apparatus may identify whether the passenger searches for the object, and when it is confirmed that the passenger searches for the object, the fallen object detecting apparatus may move the seat by adjusting the seat of the passenger in the vehicle when the passenger intends to pick up the object. In this case, the fallen object detecting apparatus may determine whether the passenger lowers his or her head based on a motion tracking result of the passenger in the image generated by the camera, and when it is determined that the passenger lowers his or her head, may confirm that the passenger searches for the object.

Further, in response to the location of the fallen object being out of the range where the passenger may pick up the object, the fallen object detecting apparatus may move the fallen object by using a tool (for example, a wireless cleaner) installed in the vehicle to a range where the fallen object is able to be picked up. As another example, the fallen object detecting apparatus may change the driving direction of the vehicle or the speed of the vehicle so that the fallen object moves to the pick up range or provide guidance for changing the driving direction of the vehicle or the speed of the vehicle via the component in the vehicle (or an internal display). For example, when the location of the fallen object is the right side of the pick up range, the fallen object detecting apparatus may move the fallen object to the left by using the tool or making a right turn (or right lane change) to move the fallen object to the pick up range.

When range where the passenger is able to pick up the fallen object includes the location of the fallen object, in step S903, the fallen object detecting apparatus may omit the step S904.

Thereafter, the fallen object detecting apparatus may identify whether the passenger picks up the fallen object. Specifically, when the hand of the passenger is in contact with the fallen object and the fallen object rises by a set distance or more as a tracking result of the passenger and the object in the image which is periodically generated by the camera, the fallen object detecting apparatus may determine that the passenger picks up the fallen object.

In step S905, when it is identified that the passenger has not picked up the fallen object, the fallen object detecting apparatus may provide guidance of a time to pick up the fallen object in step S906. That is, the fallen object detecting apparatus may provide guidance of a time to pick up the fallen object by notifying to pick up the object falling in the vehicle in a stable driving environment or notifying to pick up the fallen object in advance in the vehicle when an unstable driving environment is expected. Specifically, when the vehicle stops or is in a sector in which the vehicle drives at a predetermined speed or lower, the fallen object detecting apparatus may suggest to pick up the fallen object. Further, based on the vehicle expected to make a sharp turn or drive on an irregular road within a predetermined time or when the vehicle is expected to rapidly decelerate or accelerate, based on the navigation information of the vehicle, the fallen object detecting apparatus may suggest to immediately pick up the fallen object.

In a state where the fallen object detecting apparatus identifies that the fallen object has not been picked up by the passenger, in response to a command for adjusting the seat to a range where the fallen object may become damaged is input, the fallen object detecting apparatus may restrict the adjusting of the seat and suggest picking up the fallen object. That is, when the command for adjusting the seat is input, the fallen object detecting apparatus may determine that the movement range of the seat adjusted in response to the adjusting command includes the location of the fallen object. When it is determined that the movement range of the seat includes the location of the fallen object, the fallen object detecting apparatus may determine that the adjusting of the seat may cause damage to the fallen object, and restrict the adjusting for the seat and recommend to pick up the fallen object through the component in the vehicle (for example, an internal display).

Further, the fallen object detecting apparatus may determine whether it is necessary to pick up the fallen object, and based on a determination that it is not necessary to pick up the fallen object, may restrict the adjusting the seat of the passenger and provide the location of the object. Here, the fallen object detecting apparatus may determine whether it is necessary to pick up the fallen object depending on whether the type of the fallen object is included in a set list or determine whether it is necessary to pick up the fallen object by applying a deep neural network model trained to determine whether the fallen object is necessary for the passenger to the image of the fallen object.

Further, as the determination result, in response to a determination that it is not necessary to pick up the fallen object, the fallen object detecting apparatus may remove the object which is not necessary to pick up by using a tool in the vehicle.

Based on the fallen object being a communication device which performs short range wireless communication with the component in the vehicle, the fallen object detecting apparatus may identify whether the fallen object is connected to the component in the vehicle through short range wireless communication. Specifically, the fallen object detecting apparatus may request identification information of the fallen object. When the object identification information received from the object coincides with identification information of a device connected in the component in the vehicle as the response for the request, the fallen object detecting apparatus may confirm that the object is connected with the component by the short range wireless communication.

As a identifying result, in response to the fallen object being connected to the component in the vehicle via short range wireless communication, the fallen object detecting apparatus may temporarily stop the providing of services (for example, video playback or game play) in the fallen object and the component, and in response to the object being picked up by the passenger, the fallen object detecting apparatus may control the object and the component to continuously provide the service. That is, when an object which provides a service falls, as the passenger is not normally provided with the service, the fallen object detecting apparatus may temporarily stops the service provided by the object and the component and when the passenger picks up the fallen object so that the service is normally provided, the fallen object detecting apparatus may resume the providing of the service in the object and the component.

Further, when the driving of the vehicle is completed, the fallen object detecting apparatus may identify whether the passenger picks up the fallen object and based on the passenger not picking up the object, the fallen object detecting apparatus provides the notification information about the fallen object (for example, the objects falls on the floor) through the component in the vehicle, so that the fallen object is not left in the vehicle.

The embodiments of the present disclosure described above may be implemented through computer programs executable through various components on a computer, and such computer programs may be recorded in computer-readable media. Examples of the computer readable medium may include magnetic media such as a hard disk drives (HDD), floppy disks and a magnetic tape, optical media such as CD-ROMs and DVDs, magneto-optical media such as floptical disks, or hardware devices such as ROMs, RAMs, and flash memories specifically configured to store and execute program commands.

Meanwhile, the computer programs may be those specially designed and constructed for the purposes of the present disclosure or they may be of the kind well known and available to those skilled in the computer software arts. Examples of program code include both a machine code, such as produced by a compiler, and a higher-level code that may be executed by the computer using an interpreter.

In the present application (especially, in the appended claims), the use of the terms "the," "the above-mentioned," and/or other terms similar thereto may correspond to singular meaning, plural meaning, or both of the singular meaning and the plural meaning as necessary. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The above-mentioned steps constructing the method disclosed in the present disclosure may be performed in a proper order unless explicitly stated otherwise. However, the scope or spirit of the present disclosure is not limited thereto. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. In addition, technical ideas of the present disclosure can also be readily implemented by those skilled in the art according to various conditions and factors within the scope of the appended claims to which various modifications, combinations, and changes are added, or equivalents thereof.

The present disclosure is not limited to the example embodiments described above, and rather intended to include the following appended claims, and all modifications, equivalents, and alternatives falling within the spirit and scope of the following claims.

What is claimed is:

1. An apparatus for detecting a fallen object in a vehicle, the apparatus comprising:
    a camera configured to generate at least one image of an inside of the vehicle;
    an image identifier configured to identify at least one passenger and at least one object from the image, and to determine a location of the fallen object in response to a falling of the object in the vehicle; and
    a controller configured to provide the determined location of the fallen object via at least one component located in the vehicle and adjust a seat of the passenger based on the location of the fallen object and a condition of the passenger.

2. The fallen object detecting apparatus according to claim 1, wherein the controller is configured to set a range in which the passenger is capable of picking up the object based on the physical condition of the passenger including at least one of arm length, leg length, or hand length, and in response to the location of the object being out of the set range, adjust at least one of position, height, or angle of the seat of the passenger.

3. The fallen object detecting apparatus according to claim 1, wherein the image identifier is configured to track a movement of the object from the image generated periodically by the camera and determine, as a tracking result, that the object has fallen based on the object dropping by a predetermined distance or more or dropping to a floor of the vehicle.

4. The fallen object detecting apparatus according to claim 1, wherein the controller is configured to restrict an adjusting range of the seat of the passenger within a range in which the object does not become damaged, based on the location of the fallen object.

5. The fallen object detecting apparatus according to claim 1, wherein the image identifier is configured to track the movement of the object from the image generated periodically by the camera, and
    wherein in response to the tracked object being predicted to fall based on at least one of movement or shape of the tracked object, the controller is configured to suggest moving the object to a safe area, where it is determined that the tracked object will not fall, before the tracked object falls.

6. The fallen object detecting apparatus according to claim 1, wherein the controller is configured to suggest picking up the fallen object based on the vehicle stopping or being in a sector where the vehicle drives at a predetermined speed or lower, or
    the controller is configured to suggest immediately picking up the fallen object based on the vehicle being expected to turn sharply or drive on an irregular road within a predetermined time or based on the vehicle being expected to rapidly decelerate or accelerate, based on navigation information of the vehicle.

7. The fallen object detecting apparatus according to claim 1, wherein
    based on the fallen object being a communication device capable of being connected to the component in the vehicle via short range wireless communication, the controller is
        configured to determine whether the object is connected to the component in the vehicle, and as a determination result, in response to the object being connected to the component, temporarily stop providing services of the fallen object and the component, and
        in response to the object being picked up by the passenger, configured to control the object and the component to continuously provide the service.

8. The fallen object detecting apparatus according to claim 1, wherein the image identifier is configured to identify whether the passenger picks up the fallen object from the image periodically generated by the camera, and
    wherein the controller is configured to restrict an adjusting of the seat and suggest picking up the fallen object in response to a command for adjusting the seat to a range in which the fallen object becomes damaged being input in a state where it is identified that the fallen object is not picked up by the passenger.

9. The fallen object detecting apparatus according to claim 1, wherein in response to the location of the fallen object being out of the range in which the passenger is capable of picking up the object, the controller is configured to move the fallen object to a pick up range by using a tool installed in the vehicle or change a driving direction or speed of the vehicle to move the fallen object to the pick up range.

10. The fallen object detecting apparatus according to claim 1, wherein the image identifier is configured to determine, from the image of the fallen object, whether it is necessary to pick up the fallen object by applying a deep neural network model trained for determining whether the object is necessary for the passenger, and
    the controller is configured to restrict the providing of the location of the object and the adjusting of the seat of the passenger based on a determination that it is not necessary to pick up the fallen object.

11. The fallen object detecting apparatus according to claim 1, further comprising:
    a display configured to display a location of the fallen object.

12. The fallen object detecting apparatus according to claim 10, wherein based on the determination that it is not necessary to pick up the fallen object, the controller is configured to remove the object which is not necessary to pick up using a tool in the vehicle.

13. A method for detecting a fallen object in a vehicle, the method comprising:
    generating at least one image of an inside of the vehicle;
    identifying at least one passenger and at least one object from the image, and determining a location of the fallen object in response to a falling of the object in the vehicle; and
    providing the location of the fallen object via at least one component in the vehicle and adjusting a seat of the passenger based on the location of the fallen object and a condition of the passenger.

14. The fallen object detecting method according to claim 13, wherein the adjusting of the seat of the passenger comprises:
    setting a range in which the passenger is capable of picking up the object based on the physical condition of the passenger including at least one of arm length, leg length, or hand length of the passenger, and in response to the location of the object being out of the set range, adjusting at least one of position, height, or angle of the seat of the passenger.

15. The fallen object detecting method according to claim 13, further comprising:
   tracking a movement of the object from the periodically generated image and determining, as a tracking result, that the object has fallen based on the object dropping by a predetermined distance or more or dropping to a floor of the vehicle.

16. The fallen object detecting method according to claim 13, further comprising:
   tracking the movement of the object from the periodically generated image; and
   in response to the tracked object being predicted to fall based on at least one of movement or shape of the tracked object, suggesting to move the tracked object to a safe area, where it is determined that the tracked object will not fall, before the tracked object falls.

17. The fallen object detecting method according to claim 13, further comprising:
   suggesting to pick up the fallen object based on the vehicle stopping or being in a sector where the vehicle drives at a predetermined speed or lower; or
   suggesting to immediately pick up the fallen object based on the vehicle being expected to turn sharply or drive on an irregular road within a predetermined time or based on the vehicle being expected to rapidly decelerate or accelerate, based on navigation information of the vehicle.

18. The fallen object detecting method according to claim 13, further comprising:
   based on the fallen object being a communication device capable of being connected to the component in the vehicle via short range wireless communication, determining whether the object is connected to the component in the vehicle, and as a determination result, in response to the object being connected to the component, temporarily stopping providing of services of the fallen object and the component, and
   controlling the object and the component to continuously provide the service in response to the object being picked up by the passenger.

19. The fallen object detecting method according to claim 13, further comprising:
   identifying whether the passenger picks up the fallen object from the image periodically generated; and
   restricting the adjusting of the seat and suggesting to pick up the fallen object in response to a command for adjusting the seat to a range in which the fallen object becomes damaged is input in a state where it is identified that the fallen object is not picked up by the passenger.

20. The fallen object detecting method according to claim 13, further comprising:
   determining, from the image of the fallen object, whether it is necessary to pick up the fallen object by applying a deep neural network model trained for determining whether the object is necessary for the passenger, and
   restricting the providing of the location of the object and the adjusting of the seat of the passenger based on a determination that it is not necessary to pick up the fallen object.

* * * * *